United States Patent
Hashimoto et al.

(10) Patent No.: US 12,541,588 B2
(45) Date of Patent: Feb. 3, 2026

(54) SYSTEM AND STORAGE MEDIUM

(71) Applicant: KABUSHIKI KAISHA TOSHIBA, Tokyo (JP)

(72) Inventors: Mikio Hashimoto, Bunkyo Tokyo (JP); Atsushi Shimbo, Bunkyo Tokyo (JP); Jiro Amemiya, Machida Tokyo (JP); Hiroshi Tanaka, Yokohama Kanagawa (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 34 days.

(21) Appl. No.: 18/764,678

(22) Filed: Jul. 5, 2024

(65) Prior Publication Data
US 2025/0094574 A1 Mar. 20, 2025

(30) Foreign Application Priority Data
Sep. 19, 2023 (JP) ................................. 2023-151062

(51) Int. Cl.
*G06F 21/55* (2013.01)
*B60W 50/02* (2012.01)
*G06F 21/57* (2013.01)

(52) U.S. Cl.
CPC .......... *G06F 21/554* (2013.01); *G06F 21/575* (2013.01); *B60W 50/02* (2013.01)

(58) Field of Classification Search
CPC ..... G06F 21/554; G06F 21/575; B60W 50/02
See application file for complete search history.

(56) References Cited

U.S. PATENT DOCUMENTS

| | | | | |
|---|---|---|---|---|
| 11,010,233 | B1 * | 5/2021 | Golden | .............. G06F 11/0793 |
| 2007/0282951 | A1 * | 12/2007 | Selimis | ................... H04L 67/75 |
| | | | | 709/205 |
| 2012/0209411 | A1 | 8/2012 | Ohkado et al. | |
| 2013/0073851 | A1 | 3/2013 | Hashimoto et al. | |
| 2017/0032126 | A1 | 2/2017 | Koike et al. | |
| 12,306,953 | B2 * | 5/2025 | Morita | ................... G06F 21/575 |

(Continued)

FOREIGN PATENT DOCUMENTS

| | | | | |
|---|---|---|---|---|
| DE | 102020119153 | A1 * | 1/2021 | ........... G06F 21/554 |
| JP | 5117555 | B2 | 1/2013 | |

(Continued)

OTHER PUBLICATIONS

Henk Birkholz et al., "Remote ATtestation procedureS (RATS) Architecture," IETF RFC 9334,, DOI: 10.17487/RFC9334, 46 pages (2023).

(Continued)

*Primary Examiner* — Christopher A Revak
(74) *Attorney, Agent, or Firm* — Finnegan, Henderson, Farabow, Garrett & Dunner, LLP

(57) ABSTRACT

According to one embodiment, a system includes a central control device connected to a plurality of sub-devices each having an embedded computer. The central control device is configured to detect an anomaly caused by a cyberattack, transmit a stop instruction to each of the sub-devices to stop an operation of the system, transmit a restart instruction to each of the sub-devices to restart each of the sub-devices by secure boot, transmit a diagnostic instruction to at least one sub-device to diagnose whether or not physical elements configuring the system are degraded and determine whether or not to resume the operation of the system based on a result of the restart executed in each of the sub-devices and a result of the diagnosis executed in the at least one sub-device.

6 Claims, 4 Drawing Sheets

(56) References Cited

U.S. PATENT DOCUMENTS

| | | | |
|---|---|---|---|
| 2018/0191738 A1* | 7/2018 | David | H04L 63/105 |
| 2018/0276375 A1* | 9/2018 | Arov | G06F 21/85 |
| 2021/0075825 A1* | 3/2021 | Davis | H04L 63/1416 |
| 2021/0110037 A1* | 4/2021 | Hunt | G06F 21/554 |
| 2021/0258339 A1* | 8/2021 | Dyakin | H04W 12/122 |
| 2021/0367864 A1* | 11/2021 | Shukla | H04L 41/5074 |
| 2022/0191217 A1* | 6/2022 | Rose | H04L 63/1416 |
| 2022/0407872 A1 | 12/2022 | Min et al. | |
| 2023/0119190 A1* | 4/2023 | Zachos | H04L 63/1458 726/22 |
| 2023/0141909 A1* | 5/2023 | Truscott | G06F 11/1469 726/23 |
| 2024/0323205 A1* | 9/2024 | Kishikawa | H04L 63/1433 |

FOREIGN PATENT DOCUMENTS

| | | | | |
|---|---|---|---|---|
| JP | 2013-69053 A | 4/2013 | | |
| JP | 5689333 B2 | 3/2015 | | |
| JP | 2017-33149 A | 2/2017 | | |
| JP | 2019-145110 A | 8/2019 | | |
| WO | WO-2021014454 A1 * | 1/2021 | ......... | H04L 63/1416 |

OTHER PUBLICATIONS

Jonathan Greig, "Congressman calls on CISA to investigate air travel vulnerabilities after outage," https://therecord.media/congressman-calls-on-cisa-to-investigate-air-travel-vulnerabilities-after-outage, 2 pages (2023).

Keisuke Miyazato, "Only analysts are allowed in! But the work at Canon MJ's 'Cyber Security Lab' is surprisingly . . . ," https://ascii.jp/elem/000/004/023/4023274/, 6 pages (2020).

Apiste Corporation, "How to prevent water hammer in plumbing," https://www.apiste.co.jp/contents/pcu/chiller_guide/article/10/, 6 pages (2020).

Cable News Network, "Anomaly in US aviation system 'NOTAM' causes major air travel chaos—what's the cause?," https://www.cnn.co.jp/usa/35198483.html, 1 page (2023).

* cited by examiner

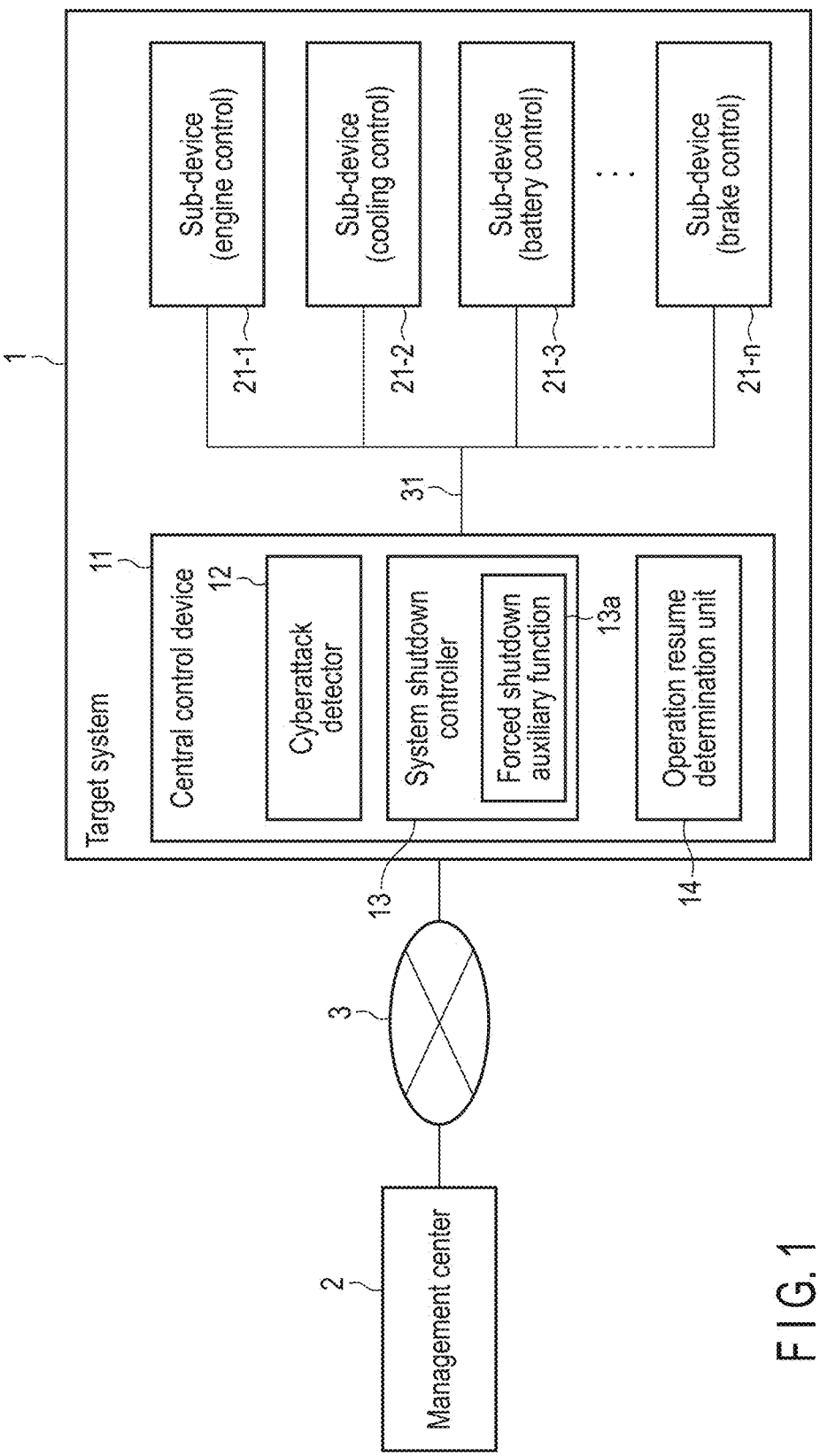
F I G. 1

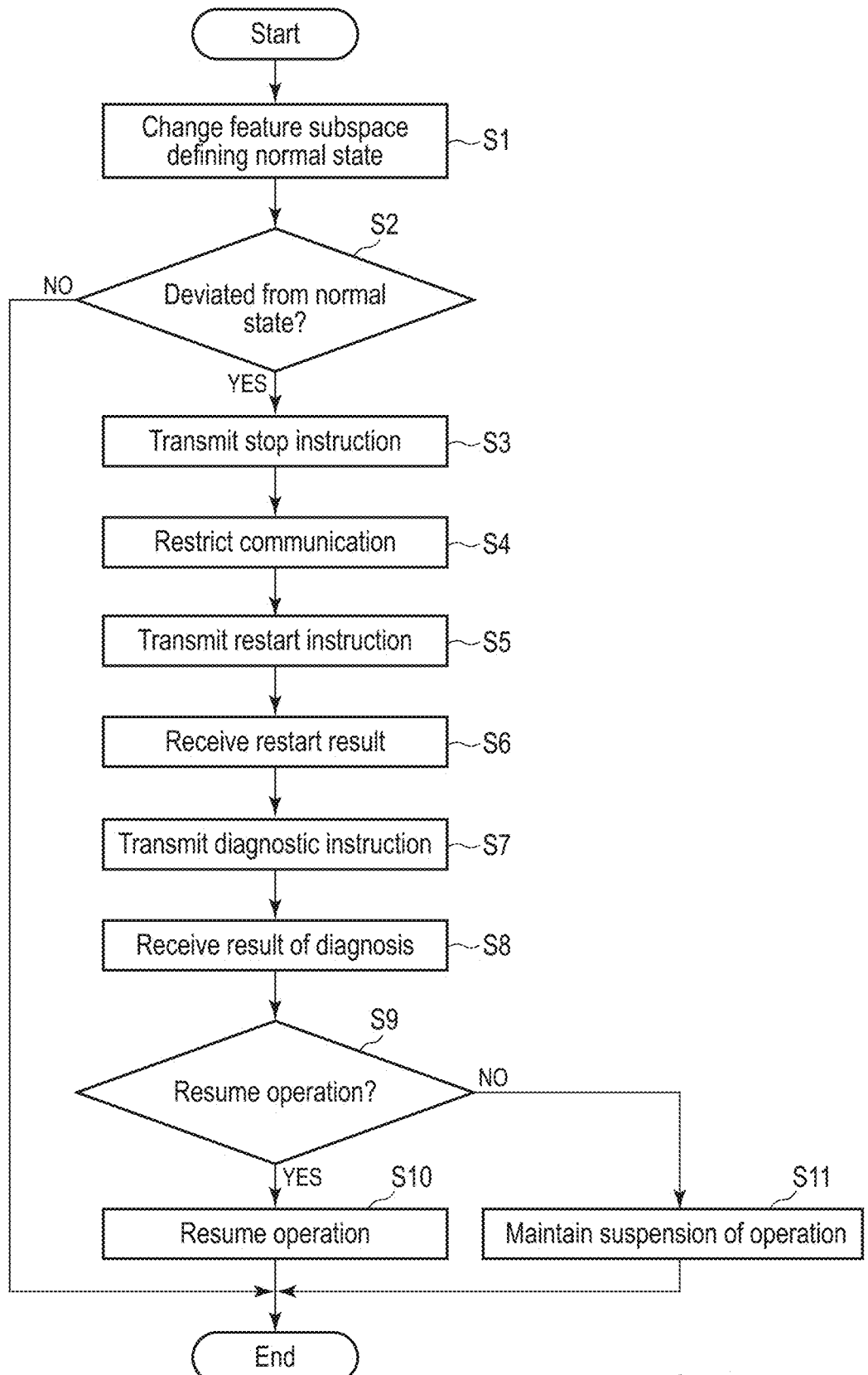
F I G. 2

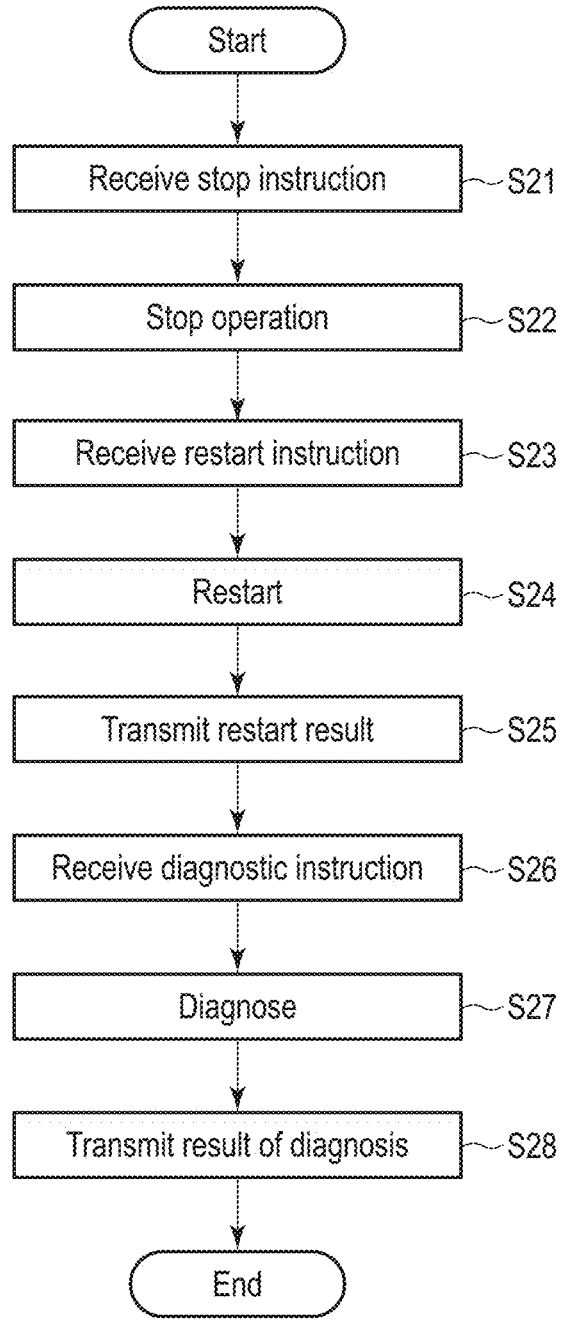
F I G. 3

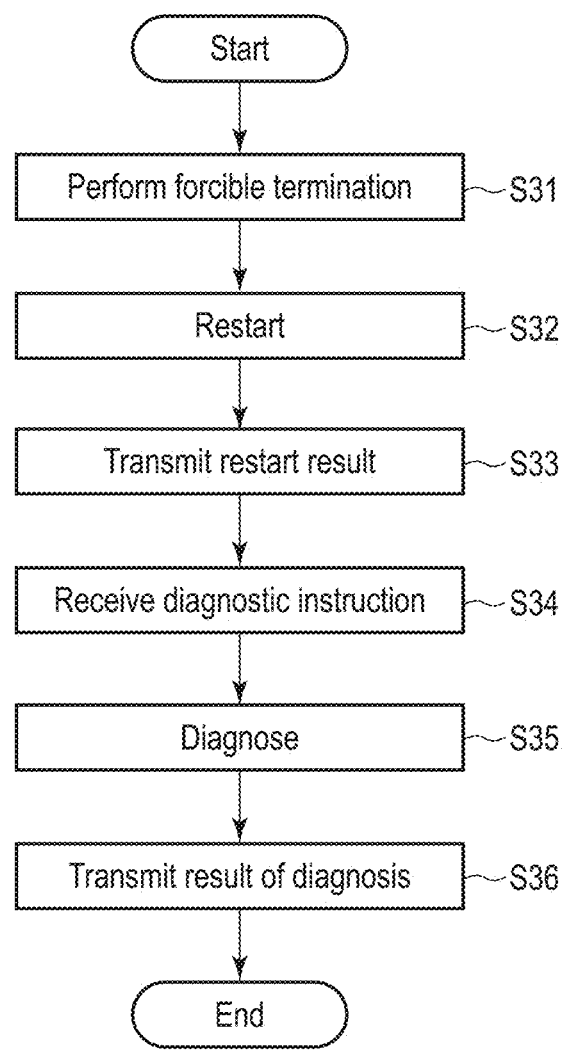
F I G. 4

SYSTEM AND STORAGE MEDIUM

CROSS-REFERENCE TO RELATED APPLICATIONS

This application is based upon and claims the benefit of priority from Japanese Patent Application No. 2023-151062, filed Sep. 19, 2023, the entire contents of which are incorporated herein by reference.

FIELD

Embodiments described herein relate generally to a system and a storage medium.

BACKGROUND

In recent years, the threat of cyberattacks has expanded from information technology (IT) to operation technology (OT) as various systems have become a cyber physical system (CPS). OT is a control and operation technology to properly operate physical devices (hardware) used in social infrastructure. For example, OT systems such as chemical plants and automobiles comprise a central control device that manages the entire system and a large number of sub-devices that manage each of a large number of physical devices included in the system. If such an OT system is subjected to a cyberattack, the system may not operate properly, and users of the system and people around them may be at risk. For example, in a case where the OT system is the above-mentioned automobile, the automobile may not operate properly and an accident or the like may occur.

By the way, in recent years, methods of cyberattacks have been evolving day by day. In order to respond to such advances in cyberattacks, machine learning is being utilized to detect cyberattacks. Detection of cyberattacks utilizing machine learning is capable of detecting not only known attack patterns but also unknown attack patterns by learning a normal state of a system to be defended and detecting deviations from the normal state.

However, there is a limit to the detection of cyberattacks utilizing such machine learning, and it is not possible to eliminate undetected or false detection of cyberattacks. Therefore, in a case where a deviation from the normal state described above (i.e., a sign of anomaly) is detected, an operator of the system to be defended must choose whether to stop the operation of the system assuming that the sign of anomaly is caused by a cyberattack, or to continue the operation of the system assuming that the sign of anomaly is caused by false detection of a cyberattack.

Stopping the operation of the system is the best choice from the viewpoint of safety for the users of the system and the people around them; however, it significantly reduces the convenience of the users. On the other hand, although continuing to operate the system can prevent a decline in convenience for the users of the system, it may pose a danger to the users and the people around them. Thus, there is a trade-off between ensuring the safety of users and preventing a decline in user convenience, and it is desirable to realize a system that achieves both.

BRIEF DESCRIPTION OF THE DRAWINGS

FIG. 1 shows an example of a schematic configuration of a control system according to one embodiment.

FIG. 2 is a flowchart showing an example of an operation of a central control device included in a target system according to the embodiment.

FIG. 3 is a flowchart showing an example of an operation of a sub-device included in the target system according to the embodiment.

FIG. 4 is a flowchart showing an example of the operation of the sub-device included in the target system according to the embodiment.

DETAILED DESCRIPTION

In general, according to one embodiment, a system includes a central control device connected to a plurality of sub-devices each having an embedded computer. The central control device is configured to detect an anomaly caused by a cyberattack based on whether or not the system deviates from a normal state. The central control device is configured to transmit, in a case where the anomaly is detected, a stop instruction to each of the sub-devices to stop an operation of the system. The central control device is configured to transmit a restart instruction to each of the sub-devices to restart each of the sub-devices by secure boot after the operation of the system is stopped. The central control device is configured to transmit a diagnostic instruction to at least one sub-device to diagnose whether or not physical elements configuring the system are degraded. The central control device is configured to determine whether or not to resume the operation of the system based on a result of the restart executed in each of the sub-devices in response to the restart instruction and a result of the diagnosis executed in the at least one sub-device in response to the diagnostic instruction.

Embodiments will be described hereinafter with reference to the accompanying drawings.

The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. Further, in the specification and drawings, corresponding elements are denoted by like reference numerals, and a detailed description thereof may be omitted unless otherwise necessary.

FIG. 1 shows an example of a schematic configuration of a control system according to an embodiment. As shown in FIG. 1, the control system comprises an OT system to be controlled (hereinafter referred to as "target system 1") and a management center 2 that remotely manages the target system 1. The target system 1 and the management center 2 are communicatively connected via a network 3, such as the Internet. Note that, in the following, it is assumed that the target system 1 is a vehicle (e.g., an automobile); however, the target system 1 can be any OT system, such as a chemical plant.

As shown in FIG. 1, the target system 1 comprises a central control device 11 and a plurality of sub-devices 21-1, 21-2, 21-3, . . . , and 21-$n$.

As described above, in the present embodiment, a case in which the target system 1 is a vehicle is assumed. Therefore, in the present embodiment, the sub-device 21-1 is a device having an embedded computer that performs, for example, engine control, the sub-device 21-2 is a device having an embedded computer that performs, for example, cooling control, the sub-device 21-3 is a device having an embedded computer that performs, for example, battery control, and the sub-device 21-n is a device having an embedded computer that performs, for example, brake control. Note that, in the following description, the plurality of sub-devices 21-1, 21-2, 21-3, . . . , and 21-n shall simply be referred to as sub-devices 21 when no particular distinction is necessary.

The central control device 11 comprises a CPU and memory, which are not shown in the drawing, and is connected to a plurality of sub-devices 21 via an intra-system network 31. The plurality of sub-devices 21 are connected to each other via the intra-system network 31 and operate in coordination with each other.

As shown in FIG. 1, the central control device 11 includes a cyberattack detector 12, a system shutdown controller 13, and an operation resume determination unit 14.

The cyberattack detector 12 detects cyberattacks caused by malicious software (malware).

In recent years, malware used in cyberattacks has various means of concealment to avoid detection by, for example, security software, and it has become difficult to detect and identify such malware simply by analyzing communication patterns on the network. Moreover, in a case where the malware used in a cyberattack is new (unknown) malware, it is difficult to immediately detect and identify the cause of damage (occurrence of accidents) or anomalies caused by the cyberattack as the new malware. In light of these circumstances and from the viewpoint of mitigating damage caused by cyberattacks, it is more important to rapidly detect anomalies caused by cyberattacks and prevent the spread of such anomalies than to determine identity of the malware used in the cyberattacks (a true cause).

One method to detect anomalies caused by cyberattacks is to utilize machine learning. This method detects anomalies caused by cyberattacks by learning a normal state of the system to be defended and detecting deviations from the normal state. According to this method, it is possible to detect anomalies caused by malware without detecting and identifying the malware used in the cyberattack (the true cause). Also, according to this method, even if the malware used in the cyberattack is new malware, it is possible to detect anomalies caused by the new malware. The cyberattack detector 12 utilizes this method to detect (signs of) anomalies caused by cyberattacks.

Specifically, first, the cyberattack detector 12 passively monitors (communication patterns of) signals transmitted and received between a plurality of sub-devices 21 via the intra-system network 31, and, also, periodically obtains information from each sub-device 21 on a logical state of the sub-device 21 and a control state of physical devices controlled by the sub-device 21 (hereinafter referred to as "information on a control state by the sub-device 21"). The cyberattack detector 12 then detects, based on the various information periodically obtained, that the target system 1 deviates from the normal state, and detects signs of anomality caused by cyberattacks.

The above information on the logical state of the sub-device 21 includes, for example, information indicating whether or not the sub-device 21 is able to normally execute a program, information indicating the amount of memory usage of the sub-device 21, and information indicating a CPU occupancy rate of the sub-device 21.

The above information on the control state by the sub-device 21 includes, for example, information indicating the engine speed and temperature controlled by the sub-device 21-1, information indicating the remaining battery capacity and temperature controlled by the sub-device 21-3.

Note that the cyberattack detector 12 detects an anomaly caused by cyberattacks also in a case of receiving from each of the sub-devices 21 a notification that an exceptional event (i.e., an anomaly) has occurred in the logical state of the sub-device 21 or a notification that an exceptional event (i.e., an anomaly) has occurred in the control state of the physical device controlled by the sub-device 21.

In a case where a sign of anomaly caused by cyberattacks is detected by the cyberattack detector 12, information on the detected sign of anomaly is transmitted to the management center 2 via the network 3. As described in detail below, when the management center 2 receives the above information on the sign of anomaly from the target system 1, the management center 2 transmits information on settings to facilitate detection of the sign of anomaly to other systems of the same type as the target system 1.

The information on settings to facilitate detection of the sign of anomaly is information to change the definition of a normal range in machine learning. In machine learning, the normal range in the target system is defined as a subspace S in a given feature space (hereinafter denoted as feature subspace S). When a point in the feature space that is associated as a precursor to an accident is in state M, the definition of the feature subspace corresponding to the normal state is changed from the previous feature subspace S containing M to a smaller feature subspace S' that does not contain M. As for the expression in the notification, if, as a result, the definition of the feature subspace corresponding to the normal state is changed to the feature subspace S' described above, information indicating the feature subspace S' is directly notified. In addition to this, weighting coefficients of an equivalent trained neural network or the like may be transmitted, or information indicating a state corresponding to M described above may be transmitted, and re-learning may be performed at the receiving end.

Note that the feature subspace defining the normal range in the target system is defined, for example, as a subspace in a given feature space that includes both information on the logical state of each sub-device and information on the control state by each sub-device.

According to this, information (knowledge) on signs of anomaly detected in the target system 1 can be shared with systems of the same type as the target system 1. Therefore, it is possible to prevent a situation where, for example, detection of a similar sign of anomaly occurred in a system of the same type is delayed and causes a serious accident. This operation does not improve the safety of the target system 1 itself that has detected abnormal signs and adverse events, but rather benefits systems of the same type by sharing abnormal signs that are precursors of adverse events through this information sharing.

The system shutdown controller 13 transmits a stop instruction to each of the sub-devices 21 to stop the operation of the target system 1. When each of the sub-devices 21 receives the above-mentioned stop instruction from the system shutdown controller 13, they stop the operation of the target system 1 by operating in coordination with each other. Note that stopping the operation of the target system 1 includes stopping a main function of each of the sub-devices 21 (i.e., shifting to a state in which it is possible to restart the system by secure boot, which is described later).

The system shutdown controller 13 has a forced shutdown auxiliary function 13a. The forced shutdown auxiliary function 13a is a function that forcibly stops and resumes the power supply to each of the sub-devices 21 in a case where the operation of the target system 1 is not stopped despite the transmission of the stop instruction described above to each of the sub-devices 21. As described in detail below, this function allows the sub-devices 21 to be forcibly terminated and restarted.

The operation resume determination unit 14 determines whether or not to resume the operation of the target system 1 that has been stopped by the system shutdown controller 13.

Here, with reference to a flowchart in FIG. 2, an example of the operation of the central control device 11 will be explained.

First, when the central control device 11 receives a change notification to change the definition of the normal state in the target system 1, or in general machine learning, the definition of the feature subspace corresponding to the normal state, from the previous feature subspace S to the smaller feature subspace S', the feature subspace corresponding to the normal state is changed to the feature subspace S' in accordance with the change notification (step S1). If the feature subspace corresponding to the normal state is a one-dimensional quantity, this process corresponds to lowering a threshold for anomaly detection.

The change notification described above is transmitted from the management center 2 in a case where, for example, an accident or the like caused by a given anomaly has occurred in another system of the same type as the target system 1. Note that changing the feature subspace S for detecting signs of a given anomaly to a smaller feature subspace S' is synonymous with increasing detection sensitivity for the given anomaly.

Note that the above process of step S1 is executed in the case where the change notification is received from the management center 2. Therefore, in a case where the change notification is not received, the process in step S2 described later is executed.

The cyberattack detector 12 of the central control device 11 detects (determines) whether or not the target system 1 deviates from the normal state based on results of monitoring the communication patterns of signals transmitted and received via the intra-system network 31 and various information periodically obtained from each sub-device 21. In other words, the cyberattack detector 12 of the central control device 11 detects whether or not the target system 1 deviates from the normal state based on whether or not the state of the target system 1 is included in the feature subspace S' corresponding to the normal state (step S2). Note that, in a case where it is detected that the target system 1 does not deviate from the normal state (NO in step S2), a series of operations here is ended.

In a case where, for example, the amount of memory usage obtained as information indicating the logical state of the sub-device 21 exceeds a threshold, the cyberattack detector 12 of the central control device 11 detects that the target system 1 deviates from the normal state, assuming that there is a possibility that the sub-device 21 may execute a process that is not executed during the normal state due to malware and may be subject to an unexpected load, and detects signs of anomaly caused by cyberattacks.

In addition, in a case where, for example, the engine temperature obtained as information indicating the control state by the sub-device 21 (sub-device 21-1) exceeds a threshold, the cyberattack detector 12 of the central control device 11 detects that the target system 1 deviates from the normal state, and detects signs of anomaly caused by cyberattacks.

In the case where it is detected that the target system 1 deviates from the normal state in the process of step S2 described above (YES in step S2), the system shutdown controller 13 of the central control device 11 transmits a stop instruction to each sub-device 21 to safely stop the operation of the target system 1 (step S3).

According to this, the central control device 11 can prevent the target system 1 from causing an accident or the like as a result of operating while deviating from the normal state. In the present embodiment, since the target system 1 is assumed to be a vehicle, the process of step S3 described above is executed so that the vehicle is safely decelerated and stopped at a safe location, such as the shoulder of a road, in consideration of surrounding conditions. This prevents the vehicle from running (operating) while deviating from its normal state and endangering the driver and people around it. Note that the function for safely and automatically stopping a vehicle has already been put into practical use, for example, as a function that is enabled when a driver is detected as being in poor physical condition. Therefore, a detailed explanation thereof will be omitted here. In the present embodiment, it is assumed that the target system 1 is a vehicle, but even if the target system 1 is a chemical plant, for example, it is important to prevent the chemical plant from causing an accident or the like as a result of operating while deviating from the normal state.

Note that, according to the process of step S3 described above, each of the sub-devices 21 can be shifted to a state in which it is possible to restart the system by secure boot, which is described later.

After the process of step S3 described above, the central control device 11 performs a process to restrict communication means that could be an intrusion route for cyberattacks. Specifically, the central control device 11 restricts (prohibits) communication with external devices via the network 3 or partially restricts (prohibits) communication via the intra-system network 31 (step S4) so as to block the cyberattack intrusion route.

According to this, the central control device 11 can prevent further cyberattacks. For example, in a case where the cause of malware being sent and executed is due to a vulnerability in a given sub-device 21, there is a possibility that further malware will be introduced and executed due to a cyberattack that exploits the vulnerability. However, by executing the process in step S4 described above, it is possible to reduce the possibility of malware being further sent and executed until the above-described restriction is lifted.

After the process of step S4 described above, the central control device 11 transmits a restart instruction to each of the sub-devices 21 to restart them using a function called secure boot (step S5). Thereafter, the central control device 11 receives (obtains) information from each of the sub-devices 21 indicating the result of the restart (success or failure of secure boot) executed in response to the above-described restart instruction (step S6).

The secure boot is a function that restarts the sub-device 21 without reading the malware even if such malware has been written to a volatile memory (e.g., DRAM, SRAM, etc.) of the sub-device 21. Note that since the central control device 11 transmits the restart instruction to each of the sub-devices 21 after preventing further cyberattacks through the process in step S4 described above, each of the sub-devices 21 can be restarted by secure boot in an environment completely free from the effects of the malware. The method of implementing secure boot in a device having an embedded computer such as the sub-device 21 is disclosed, for example, in JP 2017-33149 A by the inventors of the present application.

After the process of step S6 described above, the central control device 11 transmits a diagnostic instruction to at least one sub-device 21 (e.g., a sub-device 21 associated with a physical element that is assumed to be degraded due to the cyberattack among the physical elements configuring the target system 1) for diagnosing whether or not the physical elements configuring the target system 1 have been degraded by the cyberattack (step S7). Thereafter, the central control device 11 receives (obtains) information indicating the result of a diagnostic process executed in response to the diagnostic instruction described above from at least one of the sub-devices 21 described above (step S8).

Here, an example of the degradation that may occur in the physical elements configuring the target system 1 due to the cyberattack is described.

One example of degradation that may occur in the physical elements configuring the target system 1 is degradation of a piping of the target system 1 (vehicle) due to a water hammer phenomenon. The water hammer phenomenon is a phenomenon in which rapid operation (opening and closing) of a pump or a valve, etc. causes a sudden change in the speed of a fluid flowing through the piping, resulting in a significant change in the pressure in the piping and causing damage to the piping or connections of the piping. This phenomenon basically cannot occur in the case where the target system 1 is operating normally, however, can occur when the target system 1 deviates from its normal state due to a cyberattack; therefore, must be taken into consideration.

After the process of step S8 described above, the operation resume determination unit 14 of the central control device 11 determines whether or not to resume the operation of the target system 1 (step S9) based on the information received in step S6 indicating the restart result and the information received in step S8 indicating the diagnostic process result.

For example, the operation resume determination unit 14 of the central control device 11 determines that the operation of the target system 1 be resumed in a case where the information indicating the restart result obtained from each of the sub-devices 21 indicates that the secure boot was successful, and the information indicating the diagnostic process result indicates that it is normal (i.e., that no degradation has occurred in the physical elements). On the other hand, in other cases, the operation resume determination unit 14 of the central control device 11 determines that the operation of the target system 1 should not be resumed.

In the process of step S9 described above, in the case where it is determined that the operation of the target system 1 is to be resumed (YES in step S9), the central control device 11 resumes the operation of the target system 1 (step S10) and ends the series of operations described here.

On the other hand, in the process of step S9 described above, in the case where it is determined that the operation of the target system 1 is not to be resumed (NO in step S9), the central control device 11 maintains the suspension of the operation of the target system 1 (step S11) and ends the series of operations described here. Note that, in the present embodiment, since the target system 1 is assumed to be a vehicle, instead of the process of step S11 described above, operation with constrained conditions such as low-speed operation, so-called Limp Home Mode, may be maintained.

Note that, here, in the process of step S9 described above, the operation resume determination unit 14 of the central control device 11 determines whether or not to resume the operation of the target system 1 based on the information indicating the restart result and the information indicating the diagnostic process result. However, it is not limited thereto, and the operation resume determination unit 14 may also determine whether or not to resume the operation of the target system 1 based on analysis results of operation logs and communication logs of each of the sub-devices 21 that have been omitted from the monitoring by the central control device 11.

Next, an example of the operation of the sub-device 21 will be described with reference to a flowchart in FIG. 3.

First, when the sub-device 21 receives a stop instruction from the central control device 11 (step S21), it safely stops the operation of the target system 1 in coordination with the other sub-devices 21 (step S22).

Subsequently, when the sub-device 21 receives a restart instruction from the central control device 11 (step S23), it executes a restart process by secure boot (step S24), and transmits information indicating the result of the restart process to central control device 11 (step S25).

When the sub-device 21 receives a diagnostic instruction from the central control device 11 (step S26), it executes a diagnostic process to diagnose whether or not the physical elements configuring the target system 1 have been degraded due to the cyberattack (step S27) and transmits information indicating the result of the diagnostic process to the central control device 11 (step S28).

In a case where, after the process of step S28 described above, a notification is received from the central control device 11 to resume the operation of the target system 1, the sub-device 21 operates to resume the operation of the target system 1. On the other hand, in a case where, after the process of step S28 described above, a notification is received from the central control device 11 to maintain the suspension of the operation of the target system 1, the sub-device 21 maintains the suspension of the operation of the target system 1.

Note that, in FIG. 3, the operation of the sub-device 21 in the case where it is able to successfully receive the stop instruction from the central control device 11 is described; however, there may be a case where the sub-device 21 is unable to successfully receive a stop instruction from the central control device 11 due to an anomality caused by a cyberattack. The operation of the sub-device 21 in such a case is described below with reference to a flowchart in FIG. 4.

In a case where the operation of the target system 1 is not stopped even though the system shutdown controller 13 of the central control device 11 has transmitted the stop instruction for stopping the operation of the target system 1 to each of the sub-devices 21, the above-mentioned forced shutdown auxiliary function 13a forcibly stops and resumes the power supply to each of the sub-devices 21.

The sub-device 21 is forcibly terminated when the power supply is stopped (step S31), and executes a restart process when the power supply is resumed (step S32). The sub-device 21 transmits information indicating the result of the restart process in step S32 to the central control device 11 (step S33).

The sub-device 21 then receives a diagnostic instruction from the central control device 11 (step S34), executes a diagnostic process to diagnose whether or not the physical elements configuring the target system 1 are degraded due to the cyberattack (step S35), and transmits information indicating the result of the diagnostic process to the central control device 11 (step S36).

In a case where, after the process of step S36 described above, a notification is received from the central control device 11 to resume the operation of the target system 1, the sub-device 21 operates to resume the operation of the target system 1. On the other hand, in a case where, after the process of step S36 described above, a notification is received from the central control device 11 to maintain the suspension of the operation of the target system 1, the sub-device 21 maintains the suspension of the operation of the target system 1.

As explained above, the central control device 11 stops the operation of the target system 1 in the case where it detects signs of an anomaly caused by a cyberattack. According to this, it is possible to ensure the safety of users who use the target system 1.

In addition, as described above, the central control device 11 ensures the safety of the users who use the target system 1, restarts each sub-device 21 by secure boot, and diagnoses the degradation of the physical elements configuring the target system 1. As a result, in a case where it is determined that there is no problem in resuming the operation of the target system 1, the operation of the target system 1 is resumed. In other words, the central control device 11 can determine whether or not to resume the operation of the target system 1 without detecting and identifying the malware used in the cyberattack (the true cause). According to this, it is possible to minimize the decline in convenience for the users who use the target system 1.

As described above, according to the central control device 11 of the present embodiment, it is possible to both ensure user safety and prevent the decline in user convenience.

Note that, in the process of step S2 shown in FIG. 2, one example of a case in which the physical elements configuring the target system 1 are not degraded in spite of the detection of signs of anomaly due to cyberattacks is that the feature subspace S corresponding to the normal state for such signs of anomaly is set with a sufficient margin (i.e., defined as a sufficiently small feature subspace), and a state other than the feature subspace S is detected even when no cyberattack has occurred, thereby, causing the result of the above process in step S2 to be a so-called false positive (false detection).

In general, setting the feature subspace S for signs of anomaly with a margin is effective as a method for reducing so-called false negatives (undetected). Therefore, it is quite conceivable to operate the target system 1 by setting the feature subspace S for signs of anomaly in such a manner. On the other hand, since such an operation increases the possibility of stopping the operation of the target system 1 due to a false positive, there is a risk that user convenience may decline. In particular, in a case where the target system 1 is a vehicle and the vehicle whose operation is stopped is an emergency vehicle (e.g., ambulance, fire truck, etc.), there may be cases where human lives are indirectly affected.

Conventionally, when signs of anomaly were detected, the process corresponding to step S7 described above (i.e., the diagnostic process to diagnose whether or not degradation has occurred in the physical elements) was not executed, and thus it was not possible to estimate whether or not the detection of such signs of anomaly was due to false positives. Therefore, when a sign of anomaly was detected, it was necessary to stop the operation of the target system until the true cause of the sign of anomaly was identified and detected. Thus, considering the occurrence of the above case, there was a problem in that one had to be reluctant to set the feature subspace S for the sign of anomaly with a margin.

In contrast, the central control device 11 of the present embodiment executes the diagnostic process described above, and, in the case where it confirms that no degradation has occurred in the physical elements configuring the target system 1, assumes that the detection of signs of anomaly in the process of step S2 described above is a false positive and immediately resumes the operation of the target system 1. According to this, while ensuring user safety by setting the feature subspace S for the signs of anomaly with a margin to reduce false negatives, it is possible to estimate whether or not the detected signs of anomaly are false positives and, in the case where they are false positives, immediately resume operation of the target system 1 to minimize the decline in user convenience.

EXAMPLE

The following is an example of the operation of the central control device 11 in the present embodiment, assuming a specific situation.

In addition to the sub-devices related to vehicle driving functions, such as the sub-devices 21-1 to 21-$n$ shown in FIG. 1, a vehicle may also be provided with an IT device having an embedded computer that controls entertainment functions that depend on external services, such as a navigation system and audio system (i.e., devices that are communicatively connected to external devices via the network 3). Such IT devices have functions, for example, to visualize vehicle conditions and to notify drivers when to replace consumable parts. In order to realize such functions, the IT devices are often connected to the sub-devices 21 related to vehicle driving functions via the intra-system network 31 and authorized to obtain various information from these sub-devices 21.

Here, a case is assumed in which malware X is sent to the IT device described above via the network 3, and the malware X is executed in the IT device. Furthermore, a case is assumed in which the malware X sends (writes) malware Y to the volatile memory of the sub-device 21-2, which has an embedded computer that performs cooling control, via the intra-system network 31, and the malware Y is executed in the sub-device 21-2. Note that the malware Y is assumed to be malware that interferes with the cooling control by the embedded computer in the sub-device 21-2 to degrade the cooling function, and disguises communication with other sub-devices 21 and the central control device 11 to make it appear that the sub-device 21-2 is operating normally.

In this case, although the sub-device 21-2 appears to be operating normally due to the malware Y, the temperature of the engine controlled by the sub-device 21-1 and the temperature of the battery controlled by the sub-device 21-3 will increase due to the reduced cooling function described above. According to this, based on the temperature of the engine obtained as information indicating the control state by the sub-device 21-1 and the temperature of the battery obtained as information indicating the control state by the sub-device 21-3, the cyberattack detector 12 of the central control device 11 detects that the vehicle deviates from the normal state and detects signs of anomaly due to cyberattacks.

Thereafter, the system shutdown controller 13 of the central control device 11 transmits stop instructions to each of the sub-devices 21 to safely stop the operation of the vehicle. Note that, here, since the cyberattack is assumed to have occurred at the sub-device 21-2, which performs cooling control, there are no major problems in stopping the vehicle safely, and the vehicle is assumed to have been stopped safely.

When the vehicle is safely stopped, the central control device 11 transmits restart instructions to each of the sub-devices 21 after restricting communication between the IT device and the network 3 and between the IT device and the intra-system network 31. Since each of the sub-devices 21 executes the restart process by secure boot, the above-mentioned malware Y executed in the volatile memory is not executed, and the restart process is completed. Note that, here, it is assumed that information indicating that the secure boot was successful is transmitted from each of the sub-devices 21 as a result of the restart process executed in each of the sub-devices 21.

When the information indicating the result of the restart process is received from each of the sub-devices 21, the central control device 11 transmits diagnostic instructions to the sub-devices 21 (e.g., sub-devices 21-1, 21-2, and 21-3) related to the engine temperature anomaly or battery temperature anomaly detected as a sign of anomaly. In the sub-devices 21-1, 21-2, and 21-3, as a diagnostic process in response to the above diagnostic instructions, for example, a diagnostic process to diagnose whether or not the piping system is degraded due to the water hammer phenomenon described above is executed. In the diagnostic process, for example, a higher pressure than normal is applied to each piping section separated by valves, and the presence or absence of refrigerant leakage (refrigerant decrease) is checked to see if the piping system is degraded or not. Note that, here, it is assumed that information indicating that no degradation has occurred in the piping system is transmitted as a result of the diagnostic process executed at the sub-devices 21-1, 21-2, and 21-3.

When the information indicating the result of the diagnostic process is received from the sub-devices 21-1, 21-2, and 21-3, the operation resume determination unit 14 of the central control device 11 decides to resume the operation of the vehicle based on the information that the secure boot was successful and that no degradation has occurred in the piping system.

Thus, according to the central control device 11 of the present embodiment, even if the true cause of the detected signs of anomaly has not been detected and identified, it is possible to determine that the vehicle can run safely and to resume the operation of the vehicle.

As explained above, according to the target system 1 including the central control device 11 of the present embodiment, it is possible to both ensure the safety of the user and prevent the decline in user convenience.

Note that, as a method to directly confirm the presence or absence of cyberattacks, there is a method called remote attestation, which remotely confirms the security state of a communication partner. This method can confirm the version of the software of the communication partner and verify the software image in memory to remotely confirm whether or not the software has vulnerabilities vulnerable to cyber-attacks or whether or not the software has already been modified by cyberattacks. If this method is appropriately applied to the central control device and sub-devices included in the OT system, it is possible to directly confirm whether or not there is a cyberattack on the sub-devices and, based on the results of this confirmation, to determine whether or not the OT system can be operated.

However, computers installed in the sub-devices included in the OT system are embedded computers, which are not suitable for processing large amounts of calculations, such as verifying software images in memory. In addition, the remote attestation cannot detect whether or not the physical elements that configure the OT system have been degraded due to cyberattacks.

In contrast, the central control device 11 according to the present embodiment can even detect whether or not the physical elements configuring the target system 1 have been degraded due to cyberattacks and determine whether or not to resume the operation of the target system 1, thus ensuring the safety of the users.

In addition, in the present embodiment, each of the sub-devices 21 verifies the software image in memory by restarting through secure boot (i.e., the software image in memory is verified while the main function of each of the sub-devices 21 is stopped). Therefore, compared to a remote attestation, which verifies the software image in memory without stopping the main functions of the sub-devices, the processing load on the embedded computer in each of the sub-devices 21 can be reduced, and the verification described above can be performed efficiently and reliably.

According to one embodiment described above, it is possible to provide a system and a storage medium that can both ensure the safety of users and prevent the decline in user convenience.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A system including a central control device connected to a plurality of sub-devices each having an embedded computer, wherein
the central control device is configured to:
detect an anomaly caused by a cyberattack based on whether or not the system deviates from a normal state;
transmit, in a case where the anomaly is detected, a stop instruction to each of the sub-devices to stop an operation of the system;
transmit a restart instruction to each of the sub-devices to restart each of the sub-devices by secure boot after the operation of the system is stopped;
transmit a diagnostic instruction to at least one sub-device to diagnose whether or not physical elements configuring the system are degraded; and
determine whether or not to resume the operation of the system based on a result of the restart executed in each of the sub-devices in response to the restart instruction and a result of the diagnosis executed in the at least one sub-device in response to the diagnostic instruction.

2. The system of claim 1, wherein the central control device is configured to resume the operation of the system in a case where the result of the restart executed in each of the sub-devices indicates that the restart was successful and the result of the diagnosis executed in the at least one sub-device indicates that the diagnosis is normal.

3. The system of claim 1, wherein the central control device is configured to detect whether or not the system deviates from a normal state based on whether or not a state of the system is included in a subspace defining a given normal state in a feature space that includes both information on a logical state of each of the sub-devices and information on a control state of a physical device controlled by each of the sub-devices.

4. The system of claim 1, wherein the central control device is configured to transmit the restart instruction to each of the sub-devices in a state where a function for the system to communicate with an external device and a function for each of the sub-devices to communicate with each other are restricted.

5. The system of claim 1, wherein the system is a vehicle system comprising a mobile mechanism.

6. A non-transitory computer-readable storage medium storing instructions executed by a computer of a central control device connected to a plurality of sub-devices each having an embedded computer, wherein the instructions, when executed by the computer, cause the computer to perform:

detecting an anomaly caused by a cyberattack based on whether or not a system including the central control device and the plurality of sub-devices deviates from a normal state;

in a case where the anomaly is detected, transmitting a stop instruction to each of the sub-devices to stop an operation of the system;

transmitting a restart instruction to each of the sub-devices to restart each of the sub-devices by secure boot after the operation of the system is stopped;

transmitting a diagnostic instruction to at least one sub-device to diagnose whether or not physical elements configuring the system are degraded; and determining whether or not to resume the operation of the system based on a result of the restart executed in each of the sub-devices in response to the restart instruction and a result of the diagnosis executed in the at least one sub-device in response to the diagnosis instruction.

* * * * *